US010505760B2

(12) United States Patent
Maes

(10) Patent No.: US 10,505,760 B2
(45) Date of Patent: Dec. 10, 2019

(54) HIERARCHICAL ENCAPSULATION ACCELERATION

(71) Applicant: Ciena Corporation, Hanover, MD (US)

(72) Inventor: Richard Donald Maes, Liberty Lake, WA (US)

(73) Assignee: Ciena Corporation, Hanover, MD (US)

( * ) Notice: Subject to any disclaimer, the term of this patent is extended or adjusted under 35 U.S.C. 154(b) by 126 days.

(21) Appl. No.: 15/592,032

(22) Filed: May 10, 2017

(65) Prior Publication Data

US 2018/0176037 A1 Jun. 21, 2018

Related U.S. Application Data

(60) Provisional application No. 62/435,882, filed on Dec. 19, 2016.

(51) Int. Cl.
| | |
|---|---|
| *H04L 12/46* | (2006.01) |
| *H04L 12/715* | (2013.01) |
| *H04L 12/721* | (2013.01) |
| *H04L 12/741* | (2013.01) |
| *H04L 12/24* | (2006.01) |
| *H04L 12/26* | (2006.01) |
| *H04L 12/823* | (2013.01) |

(52) U.S. Cl.
CPC ........ *H04L 12/4633* (2013.01); *H04L 41/142* (2013.01); *H04L 43/022* (2013.01); *H04L 43/04* (2013.01); *H04L 43/14* (2013.01); *H04L 47/32* (2013.01); *H04L 2212/00* (2013.01)

(58) Field of Classification Search
CPC ... H04L 12/4633; H04L 43/022; H04L 43/14; H04L 45/04; H04L 45/66; H04L 45/74; H04L 2212/00
See application file for complete search history.

(56) References Cited

U.S. PATENT DOCUMENTS

| | | | | |
|---|---|---|---|---|
| 5,953,338 A | * | 9/1999 | Ma | H04L 12/5602 370/377 |
| 6,611,522 B1 | * | 8/2003 | Zheng | H04L 45/742 370/395.21 |

(Continued)

*Primary Examiner* — Jason E Mattis
*Assistant Examiner* — Bailor C. Hsu
(74) *Attorney, Agent, or Firm* — Clements Bernard Walker; Christopher L. Bernard; Lawrence A. Baratta, Jr.

(57) ABSTRACT

A method for a network device. The method includes receiving, by an encapsulation engine from a data path processor, a channel identifier in connection with a data frame, where the channel identifier identifies a channel of the network, traversing, by the encapsulation engine based on the channel identifier in connection with the data frame, a hierarchical data structure, where the hierarchical data structure includes a number of hierarchical encapsulation data items corresponding to a number of channels, selecting, from the number of hierarchical encapsulation data items by the encapsulation engine based on the traversing the hierarchical data structure, a number of linked encapsulation data items that are linked to the channel identifier, generating, by the encapsulation engine based on the number of linked encapsulation data items, an encapsulation result, and sending, to the data path processor, the encapsulation result for transmitting the data frame via at least the channel.

16 Claims, 10 Drawing Sheets

(56) References Cited

U.S. PATENT DOCUMENTS

| | | | | |
|---|---|---|---|---|
| 6,658,021 | B1* | 12/2003 | Bromley | H04L 45/742 |
| | | | | 370/466 |
| 6,771,655 | B1* | 8/2004 | O'Loughlin | H04L 12/403 |
| | | | | 370/449 |
| 7,492,714 | B1* | 2/2009 | Liao | H04L 12/4604 |
| | | | | 370/235 |
| 7,581,226 | B2* | 8/2009 | Thurner | G06F 8/24 |
| | | | | 717/102 |
| 7,587,427 | B2* | 9/2009 | Satou | G06F 3/0605 |
| 9,548,917 | B2* | 1/2017 | Jain | H04L 45/16 |
| 10,003,531 | B2* | 6/2018 | Zhou | H04L 12/4633 |
| 2010/0191911 | A1* | 7/2010 | Heddes | G06F 15/16 |
| | | | | 711/118 |
| 2017/0070427 | A1* | 3/2017 | Zeng | H04L 45/54 |
| 2017/0310582 | A1* | 10/2017 | Anand | H04L 12/4641 |
| 2018/0019948 | A1* | 1/2018 | Patwardhan | H04L 47/803 |

\* cited by examiner

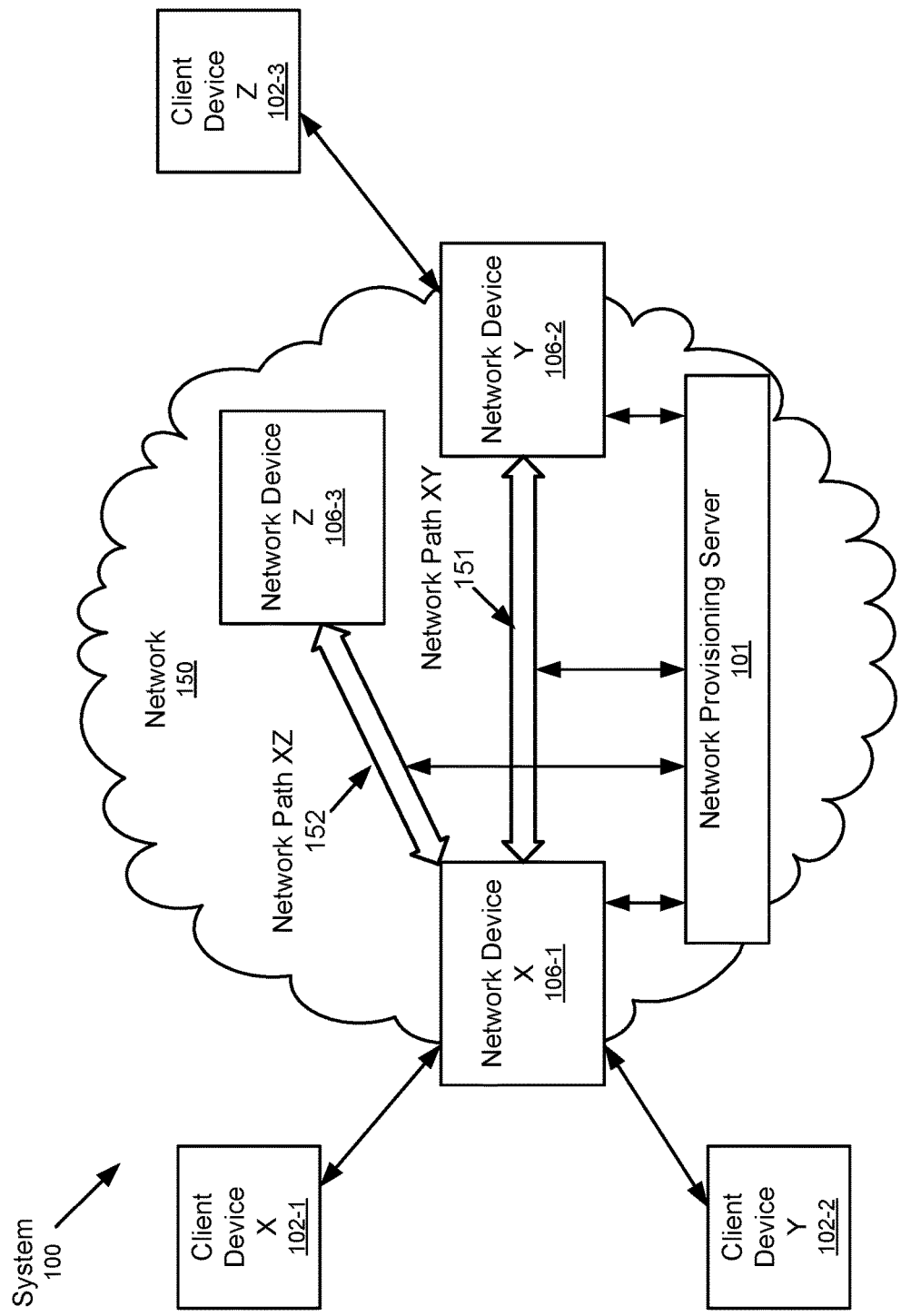
FIG. 1.1

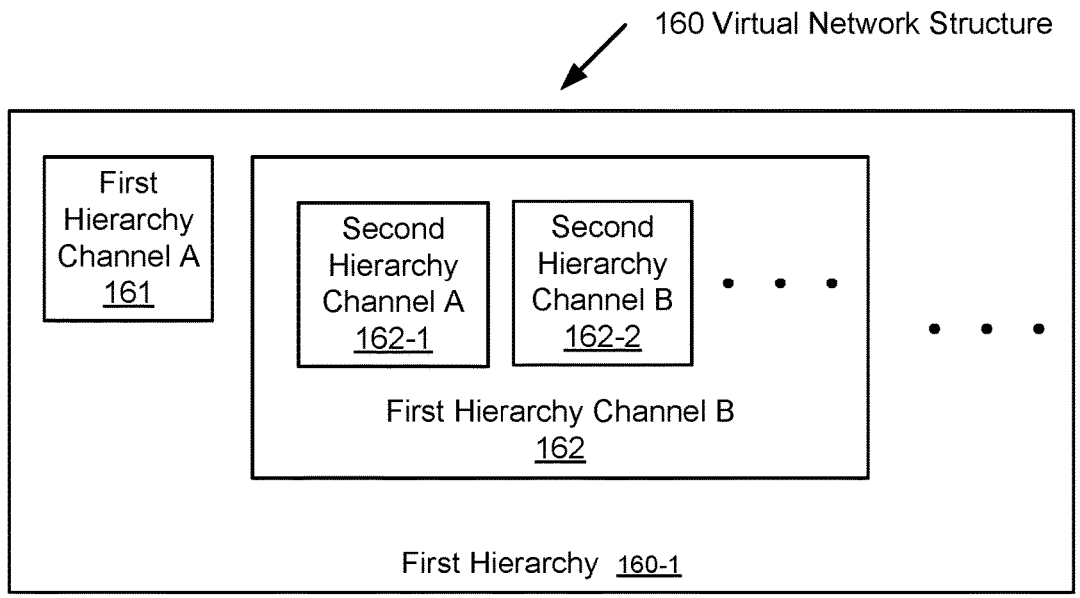
FIG. 1.2
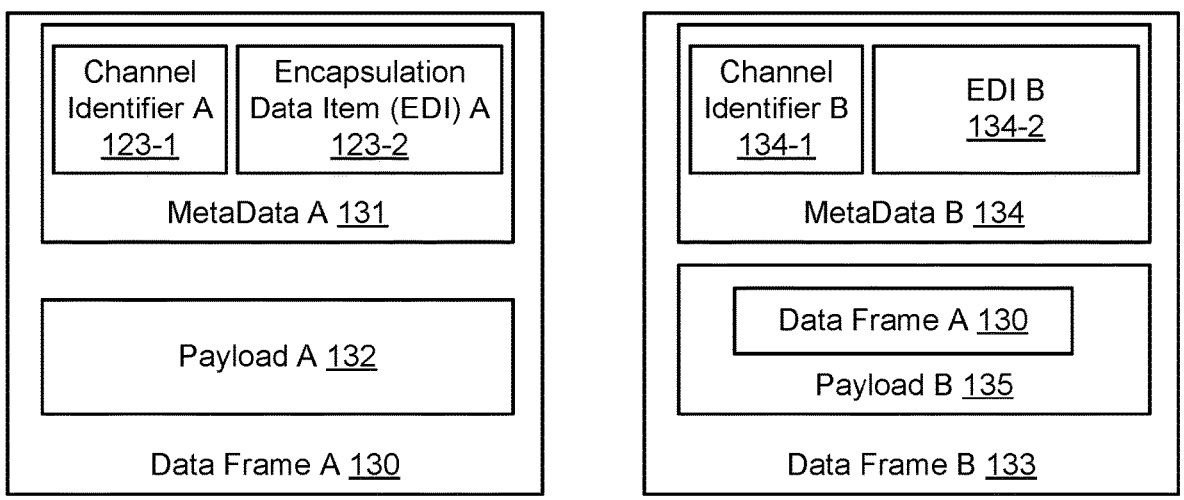
FIG. 1.3

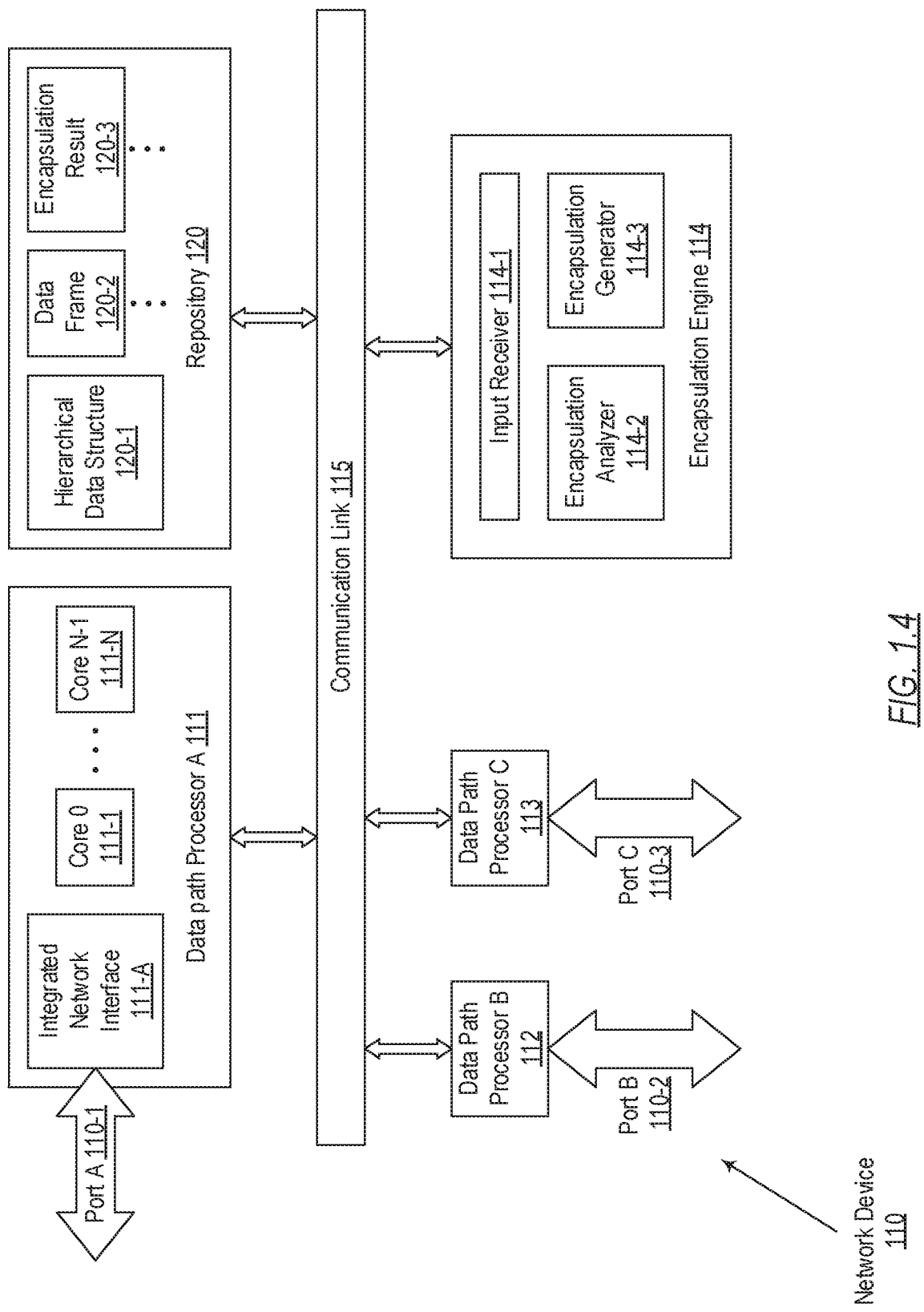
FIG. 1.4

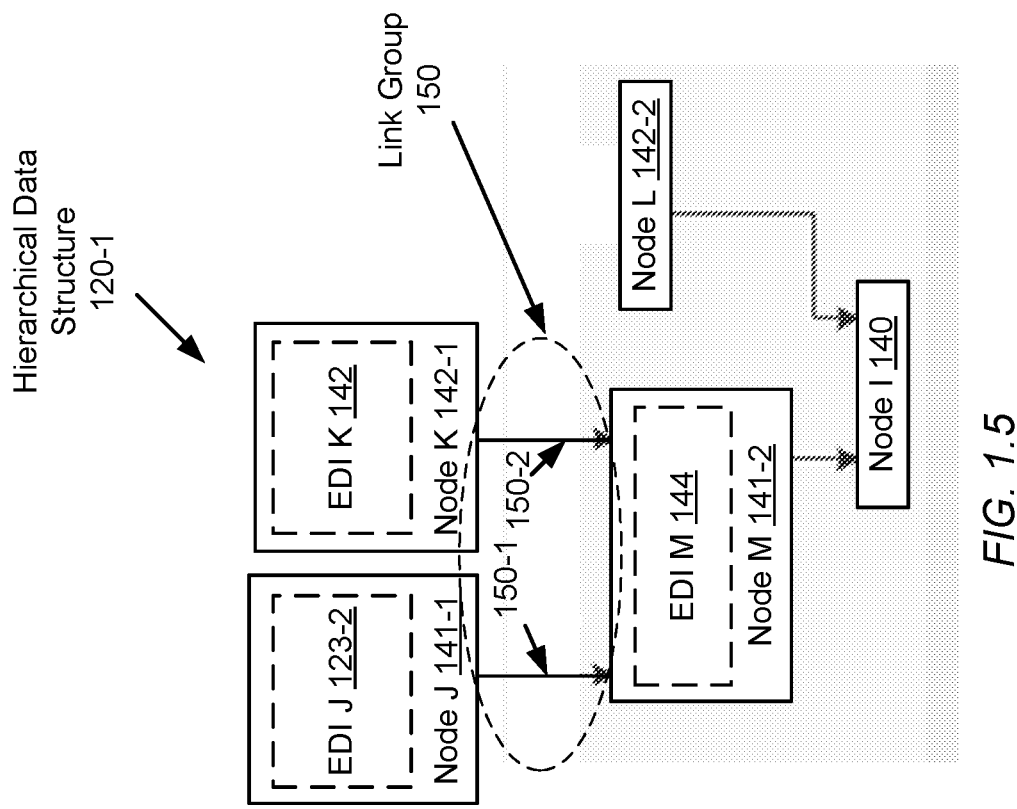
FIG. 1.5

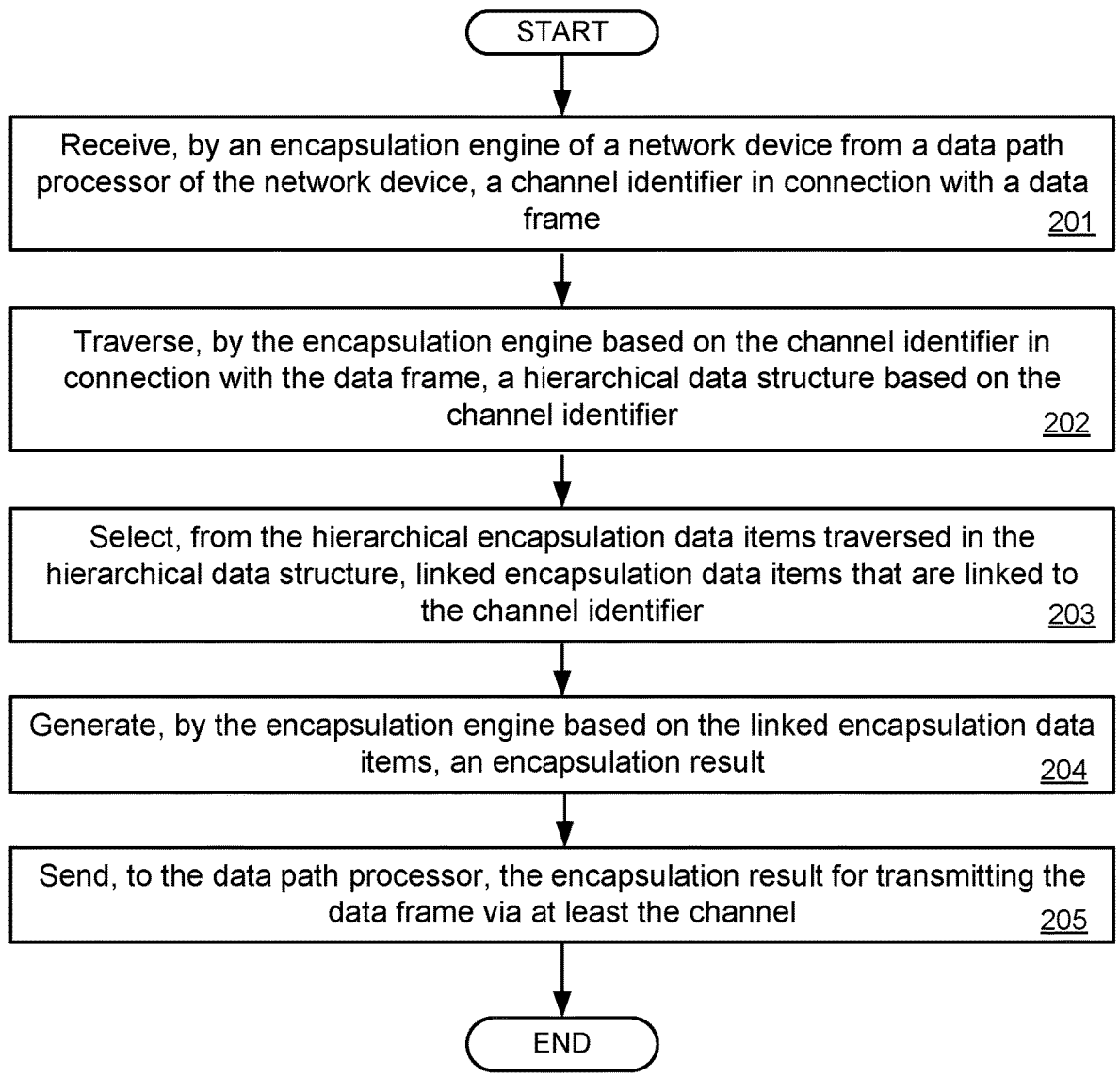
FIG. 2.1

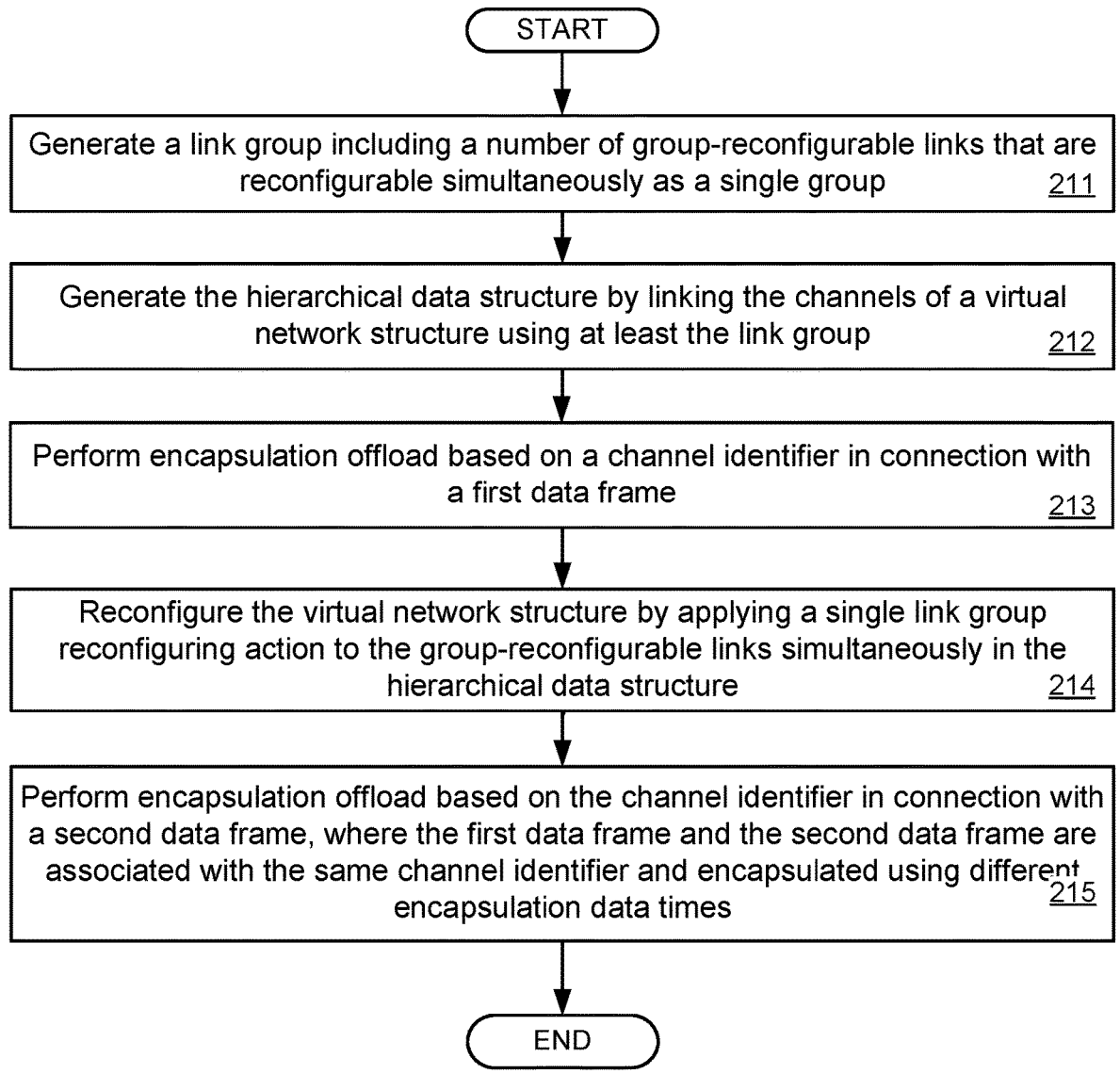
FIG. 2.2

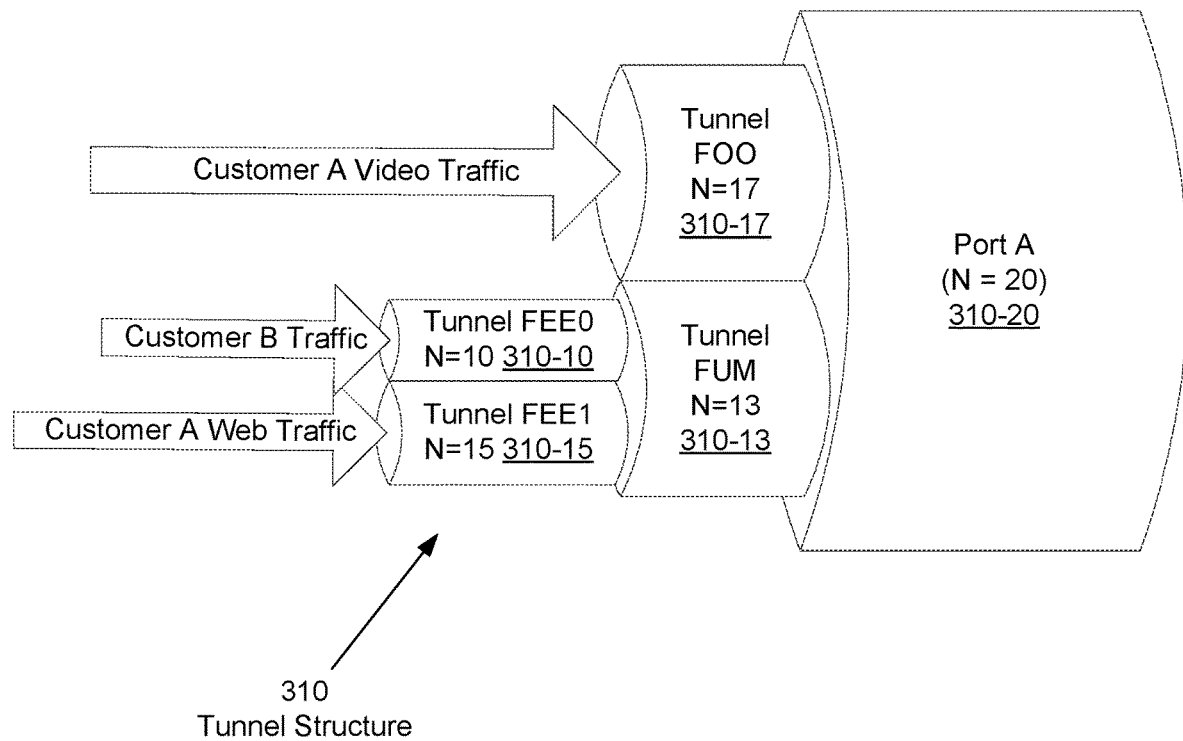
*FIG. 3.1*
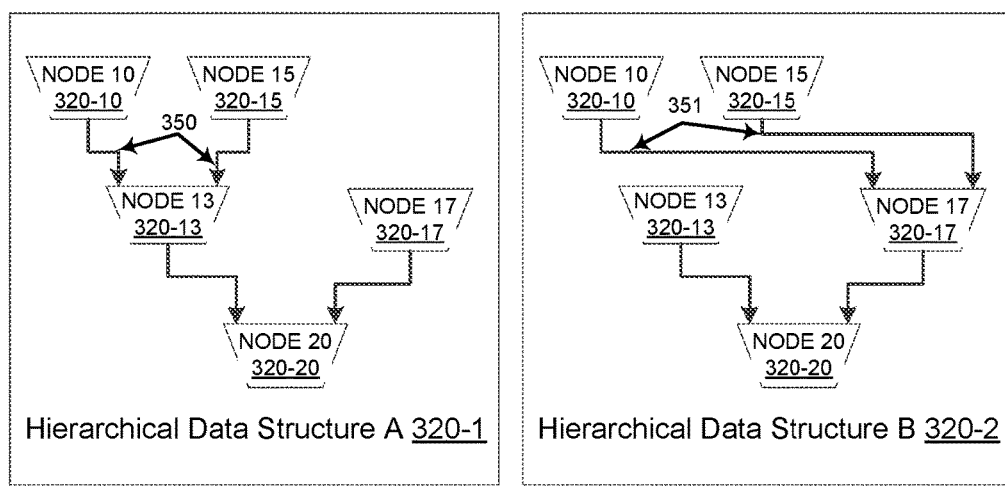
*FIG. 3.2*

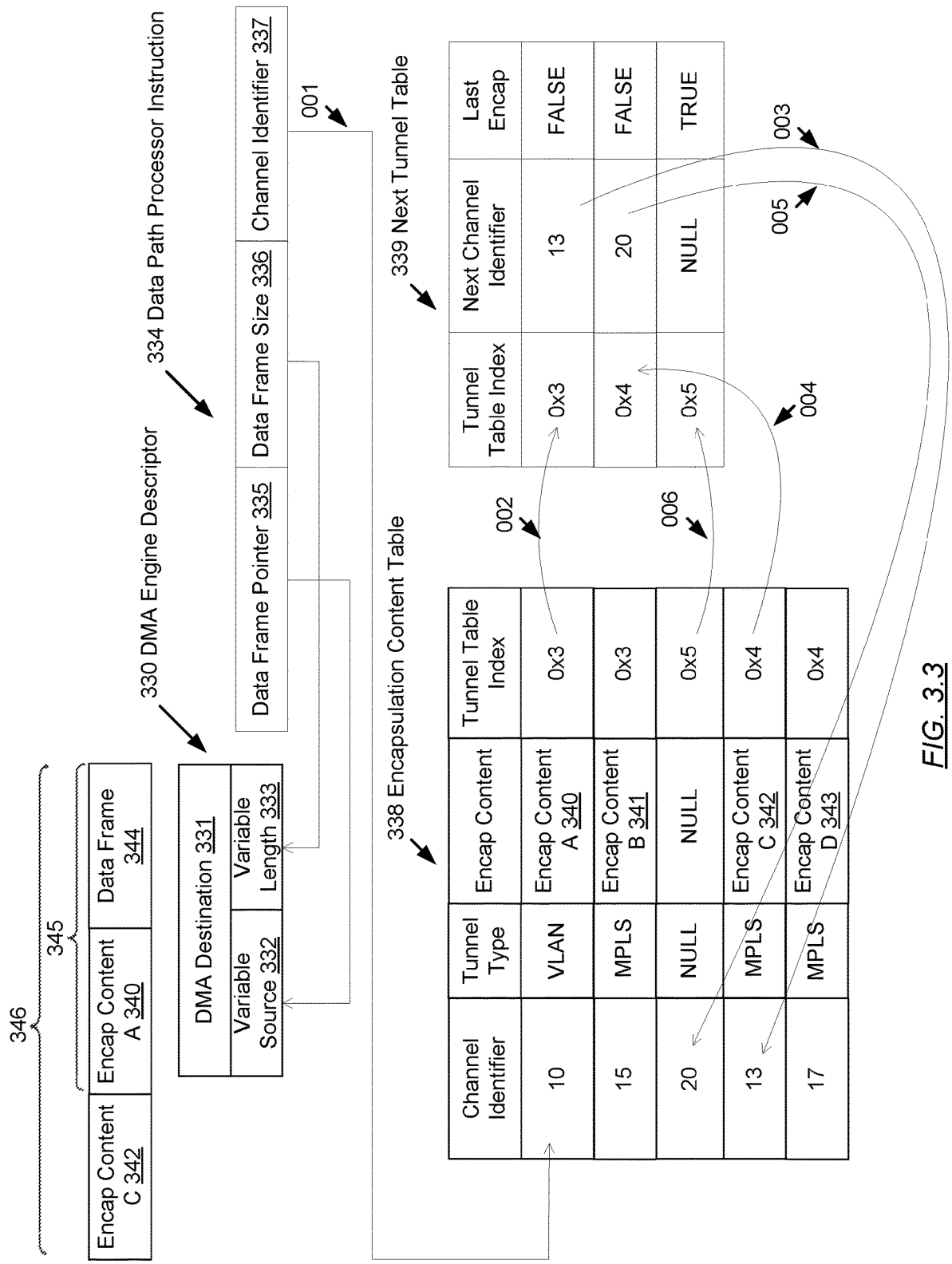
FIG. 3.3

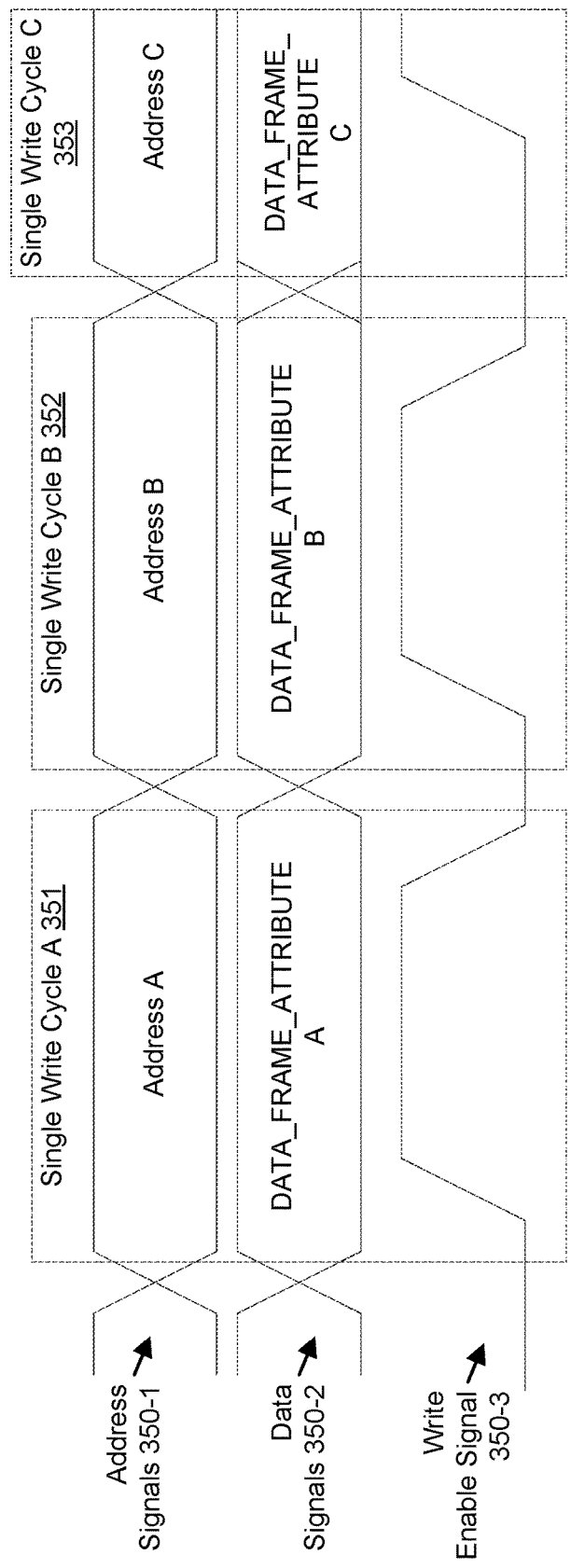

HIERARCHICAL ENCAPSULATION ACCELERATION

CROSS-REFERENCE TO RELATED APPLICATIONS

This application claims benefit under 35 U.S.C. § 119(e) of U.S. Provisional Patent Application No. 62/435,882, filed on Dec. 19, 2016, and entitled "HIERARCHICAL ENCAPSULATION ACCELERATION," which is hereby incorporated by reference.

BACKGROUND

Encapsulation is a scheme that enables an upper network layer to send data via a lower network layer's connection. Encapsulation is performed by adding control information or other metadata (referred to as encapsulation data item) of the upper network layer within payload packets transmitted by the lower network layer. The lower network layer data frame is forwarded to the destination node as a stream of bits, where decapsulation is performed to extract and interpret the data frame at the upper network layer.

SUMMARY

In general, in one aspect, the invention relates to a method for operating a network. The method includes receiving, by an encapsulation engine of a network device from a data path processor of the network device, a channel identifier in connection with a first data frame, where the channel identifier identifies a channel of a number of channels of the network, traversing, by the encapsulation engine based on the channel identifier in connection with the first data frame, a hierarchical data structure, where the hierarchical data structure includes a number of hierarchical encapsulation data items corresponding to the number of channels, selecting, from the number of hierarchical encapsulation data items by the encapsulation engine based on the traversing the hierarchical data structure, a first number of linked encapsulation data items that are linked to the channel identifier, generating, by the encapsulation engine based on the first number of linked encapsulation data items, a first encapsulation result, and sending, to the data path processor, the first encapsulation result for transmitting the first data frame via at least the channel.

In general, in one aspect, the invention relates to a network device of a network. The network device includes an encapsulation engine, a data path processor, and a repository. The encapsulation engine is configured to receive, from a data path processor, a channel identifier in connection with a first data frame, where the channel identifier identifies a channel of a number of channels of the network, traverse, based on the channel identifier in connection with the first data frame, a hierarchical data structure, where the hierarchical data structure includes a number of hierarchical encapsulation data items corresponding to the number of channels, select, from the number of hierarchical encapsulation data items based on the traversing the hierarchical data structure, a first number of linked encapsulation data items that are linked to the channel identifier, generate, based on the first number of linked encapsulation data items, a first encapsulation result, and send, to the data path processor, the first encapsulation result. The data path processor is configured to send, to the encapsulation engine, the channel identifier in connection with the first data frame, and transmit the first data frame via at least the channel based on the first encapsulation result. The repository stores the hierarchical data structure and the first data frame.

In general, in one aspect, the invention relates to an encapsulation engine circuitry for a network device. The encapsulation engine circuitry includes an input receiver, an encapsulation analyzer, and an encapsulation generator. The input receiver is configured to receive, from a data path processor of the network device, a channel identifier in connection with a first data frame, where the channel identifier identifies a channel of a number of channels of the network. The encapsulation analyzer is configured to traverse, based on the channel identifier in connection with the first data frame, a hierarchical data structure, where the hierarchical data structure includes a number of hierarchical encapsulation data items corresponding to the number of channels, and select, from the number of hierarchical encapsulation data items based on the traversing the hierarchical data structure, a first number of linked encapsulation data items that are linked to the channel identifier. The encapsulation generator is configured to generate, based on the first number of linked encapsulation data items, a first encapsulation result, and send, to the data path processor, the first encapsulation result for transmitting the first data frame via at least the channel.

Other aspects of the invention will be apparent from the following description and the appended claims.

BRIEF DESCRIPTION OF DRAWINGS

FIGS. 1.1, 1.2, 1.3, 1.4 and 1.5 show block diagrams of a system in accordance with one or more embodiments of the invention.

FIGS. 2.1 and 2.2 show flowcharts in accordance with one or more embodiments of the invention.

FIGS. 3.1, 3.2, 3.3, 3.4, and 3.5 show an example in accordance with one or more embodiments of the invention.

DETAILED DESCRIPTION

Figure 4:
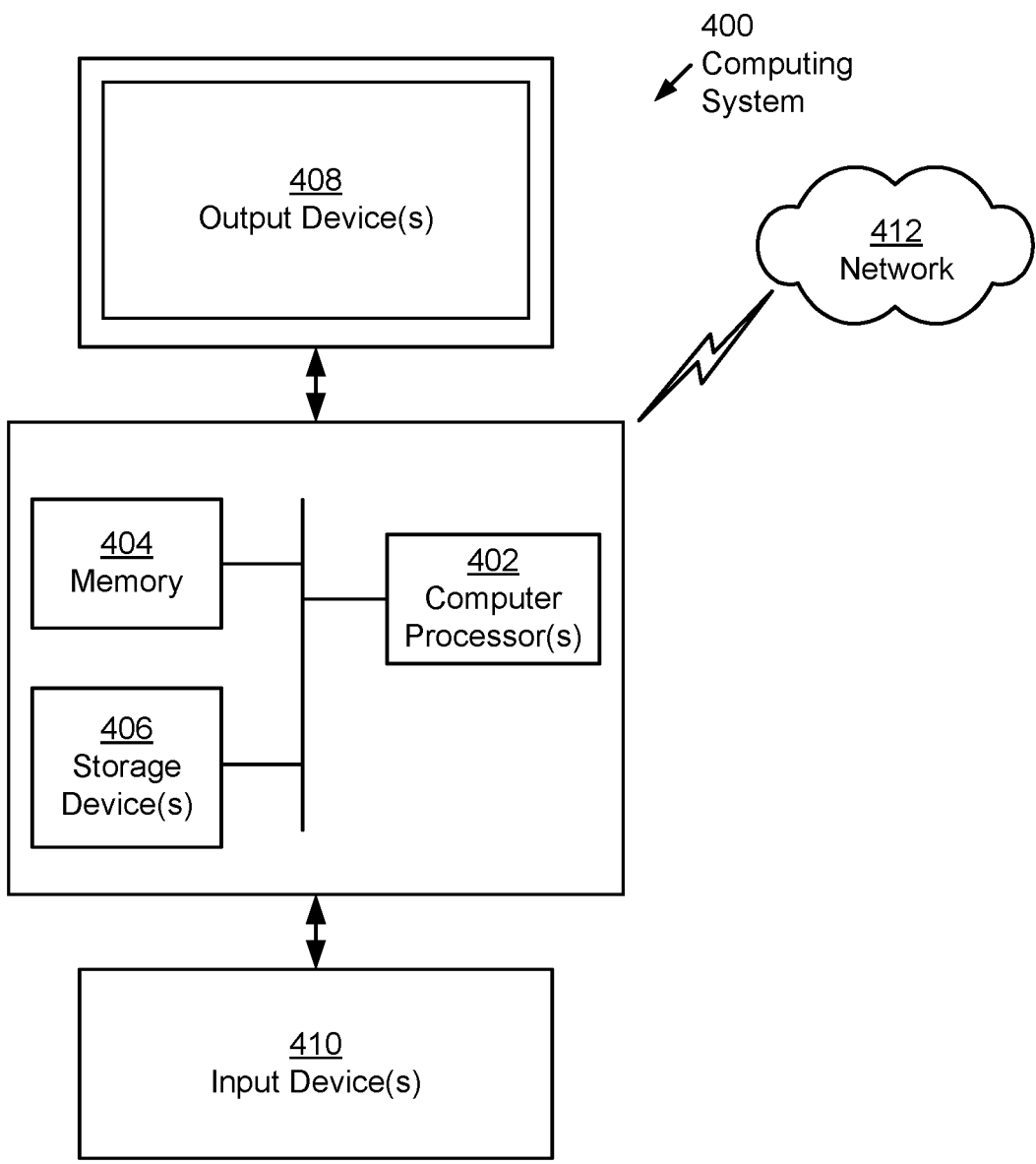
FIG. 4 shows a computing system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for operating a network with hierarchical encapsulation acceleration. Hierarchical encapsulation is a series of encapsulations performed for a hierarchy of network layers. During hierarchical encapsulation, each network layer adds a header and/or trailer containing the encapsulation data item to the data frame of the layer above. Hierarchical encapsulation acceleration refers to accelerating the retrieval of hierarchical encapsulation data items by separating the computing resource that retrieves the hierarchical encapsulation data items (i.e., encapsulation engine) from the computing resource that processes other aspects of network traffic (i.e., data path processor), such as routing and transmission of encapsulated network data. In this context, hierarchical encapsulation acceleration is also referred to as hierarchical encapsulation offload. One or more embodiments offload the hierarchical encapsulation data item retrieval from the operations of the data path processor in such a way to minimize the amount of processing by the data path processor. Thus, the data path processor may expend computational resources on processing actual data frames.

In one or more embodiments of the invention, a channel identifier is received, by an encapsulation engine of a network device from a data path processor of the network device, in connection with a data frame, where the channel identifier identifies a channel in a number of channels of the network. Based on the channel identifier in connection with the data frame, a hierarchical data structure is traversed by the encapsulation engine based on the channel identifier. The hierarchical data structure includes hierarchical encapsulation data items corresponding to the channels. From the hierarchical encapsulation data items and based on the traversing the hierarchical data structure, a number of linked encapsulation data items that are linked to the channel identifier are selected by the encapsulation engine. Accordingly, an encapsulation result is generated by the encapsulation engine based on the linked encapsulation data items. The encapsulation result is then sent to the data path processor for transmitting the data frame via at least the channel.

In one or more embodiments of the invention, the data path processor executes a single write instruction to transmit the channel identifier in connection with the first data frame. The single write instruction includes the channel identifier, a data frame pointer referencing the data frame, and a data frame size of the data frame. In one or more embodiments, the single write instruction initiates a single write cycle of a communication link between the data path processor and the encapsulation engine, where the single write cycle includes a write address based on the channel identifier and a write data item based on the data frame pointer and the data frame size of the data frame.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes multiple client devices (e.g., client device X (102-1), client device Y (102-2), client device Z (102-3), etc.) connected by a network (150) in accordance with one or more embodiments. A network is a set of interconnected computing devices that are configured to receive and forward packets in order to transmit information from a source client device to a destination client device. In one or more embodiments of the invention, the network (150) includes one or more of a local area network (LAN), a wide area network (WAN), a telecommunication network, etc, and may include wired and/or wireless portions of the Internet.

In general, the network (150) provides network services to the client devices (e.g., client device X (102-1), client device Y (102-2), client device Z (102-3), etc.). In particular, the network services are provided by one or more service providers operating the network (150) to one or more users of the client devices. For example, one or more client devices (e.g., client device X (102-1), client device Y (102-2), client device Z (102-3), etc.) may be configured to send data over the network (150). Similarly, one or more client devices (e.g., client device X (102-1), client device Y (102-2), client device Z (102-3), etc.) may be configured to receive data over the network (150). In one or more embodiments, the network services allow the client devices (e.g., client device X (102-1), client device Y (102-2), client device Z (102-3), etc.) to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices.

The client devices (e.g., client device X (102-1), client device Y (102-2), client device Z (102-3), etc.) may be computing devices of any type including mobile phones, desktop or tablet personal computers (PCs) used by the users, routers, switches or servers operated by the users for accessing the network (150), or other devices operated by the users. Examples of the client devices (e.g., client device X (102-1), client device Y (102-2), client device Z (102-3), etc.) may correspond to various portions of the computing system described in reference to FIG. 4 below.

Within the network (150), the network device X (106-1), network device Y (106-2), network device Z (106-3), etc., may be computing devices of any type, including servers, routers, switches, etc., operated by one or more service providers of the network (150). Each network device (e.g., network device X (106-1), network device Y (106-2), network device Z (106-3)) may have one or more ports, which are physical and/or logical interfaces for communicating with other network devices. Examples of the network devices (e.g., network device X (106-1), network device Y (106-2), network device Z (106-3)) of the network (150) may correspond to various portions of the computing system described in reference to FIG. 4 below.

Further, a network path (e.g., network path XY (151), network path XZ (152)) between two network devices is a sequence of one or more network links, one or more intermediate elements, and/or any intervening devices that connect the two network devices. A network link may be a connection between two ports residing on two separate network devices (i.e., external link) or within a single network device (i.e., internal link). In one or more embodiments, a network device may be connected to multiple network paths. For example, the network device X (106-1) is connected to the network path XY (151) and the network path XZ (152). In one or more embodiments, multiple network paths may exist between two network devices. Accordingly, packets or other communication data may be exchanged between the two network devices via one or more of the network paths. In one or more embodiments, the network path XY (151) is used to provide the network services to the client device X (102-1), client device Y (102-2), and client device Z (102-3) where the network device X (106-1) and network device Y (106-2) act as the interfaces (i.e., edge network devices) to the network (150). In one or more embodiments, the network (150) includes multiple layers according to a layered network architecture, such as the seven-layer OSI model of computer networking. In such embodiments, the network paths (e.g., network path XY (151)) may include network links, intermediate elements, and/or any intervening devices that support or otherwise are associated with one or more network layers.

As further shown in FIG. 1.1, the network (150) includes a network provisioning server (101) in accordance with one or more embodiments. The network provisioning server (101) has many functions including network service provisioning. Network service provisioning involves the process of identifying and allocating resources in the network (150) to provide the network services to the client devices (e.g., client device X (102-1), client device Y (102-2), client device Z (102-3), etc.). In particular, identifying the resources includes device discovery, routing, and path computation in the network (150). In one or more embodiments, the network provisioning server (101) is configured to create, modify, terminate (i.e., tear down), and restore (i.e., reestablish) connections between the client devices based on network paths in the network (150). For example, the network path XY (151) may be computed or otherwise generated by the network provisioning server (101) to provide a path through the network (150) for the client device X (102-1) and client device Z (102-3). In addition, bandwidth and other resources of the links, intermediate elements, and/or any intervening devices in the network path XY (151) are allocated by the network provisioning server (101) to the connection according to a service agreement between one or more service providers of the network (150) and the users of the client device X (102-1) and client device Z (102-3). In one or more embodiments, the network provisioning server (101) is a dedicated physical device separate from the network devices (e.g., network device X (106-1), network device Y (106-2), network device Z (106-3)) that provide telecommunication between the client devices. In one or more embodiments, at least a portion of the network provisioning server (101) may be distributed and reside within the devices (e.g., device X (106-1), device Y (106-2), device Z (106-3)) that provide telecommunication between the client devices.

Although FIG. 1.1 only shows three client devices (e.g., client device X (102-1), client device Y (102-2), client device Z (102-3)), three network devices (e.g., network device X (106-1), network device Y (106-2), network device Z (106-3)), and two network paths (e.g., network path XY (151), network path XZ (152)), those skilled in the art, having the benefit of this detailed description, will appreciate that the system (100) may have any number of client devices, network devices, and network paths. Further, different network paths may share one or more devices or have different devices altogether.

In one or more embodiments, a portion of the network (150) may be provisioned as a virtual network structure described in detail below. Based on the virtualization technology, network devices, links, and other resources of the network (150) may be logically divided into virtualized building blocks. In one or more embodiments, the virtual network structure is a structure of virtualized building blocks that connect, or chain together, to create communication services. For example, the network path XY (151) may be part of a virtual network structure, such as a tunnel or a virtual private network (VPN). In another example, a portion of the bandwidth of the network path XY (151) may be provisioned as a virtual network structure (160) described in reference to FIG. 1.2 below.

In one or more embodiments, a portion of the virtualized building blocks in the virtual network structure (160) are chained together to form a logical connection medium referred to as a channel of the virtual network structure (160). In other words, a channel is a logical connection medium and includes a portion of the virtualized building blocks that are chained together. In one or more embodiments, the virtual network structure (160) and channels are hierarchical. FIG. 1.2 shows the virtual network structure (160) that is organized as a first hierarchy (160-1) having a first hierarchy channel A (161), a first hierarchy channel B (162), etc. A hierarchy channel is a channel in a hierarchy, such as the first hierarchy (160-1). Further, the first hierarchy channel B (162) includes a second hierarchy channel A (162-1), a second hierarchy channel B (162-2), etc. In this context, each of the first hierarchy channel A (161) and first hierarchy channel B (162) is considered as a channel "within" a channel. Similarly, each of the second hierarchy channel A (162-1) and second hierarchy channel B (162-2) is considered as a channel "within" a channel "within" a channel. In one or more embodiments, the hierarchies or channels of the virtual network structure (160) correspond to the network layers having hierarchical encapsulations. For example, the second hierarchy channel A (162-1) and second hierarchy channel B (162-2) correspond to upper network layers with respect to the first hierarchy channel B (162). In other words, the first hierarchy channel B (162) corresponds to a lower network layer with respect to the second hierarchy channel A (162-1) and/or second hierarchy channel B (162-2). In one or more embodiments, the channels of the virtual network structure (160) are tunnels or parts of a VPN. A tunnel is a channel based on a tunneling protocol that uses the data portion of a packet (the payload) to carry the packets that actually provide the service. Tunneling uses a layered protocol model such as those of the OSI or TCP/IP protocol suite, but usually violates the layering when using the payload to carry a service not normally provided by the network. Examples of layered tunneling protocol include Generic Routing Encapsulation (GRE) protocol, Layer 2 Tunneling Protocol (L2TP), secure Multiprotocol Label Switching (MPLS) protocol, etc. In one or more embodiments, the channel corresponding to the first hierarchy (160-1) encompasses multiple layers of channels and couples to ingress port and/or egress port of a network device. From the perspective of the network device, the first hierarchy (160-1) corresponds to an ingress port and/or egress port.

Although FIG. 1.2 only shows two levels of hierarchies and four hierarchy channels, those skilled in the art, having the benefit of this detailed description, will appreciate that the virtual network structure (160) may have any number of hierarchical levels and/or hierarchy channels. Further, the virtual network structure (160) may include other types of virtualized building blocks. An example of the virtual network structure (160) is described in reference to FIG. 3.1 below.

Generally, communication data may be transmitted in the network (150) in individual data packet collections that are referred to as data frames, such as the data frame A (130) and data frame B (133) depicted in FIG. 1.3. For communication data transmitted over the virtual network structure (160), control information and/or other metadata are encapsulated for each channel. As shown in FIG. 1.3, the data frame A (130) includes the metadata A (131) and payload A (132) that are transmitted via a channel of the virtual network structure (160). The payload A (132) includes data packets of the communication data. The metadata A (131) includes a channel identifier A (123-1) to identify the channel. For example, the channel identifier A (123-1) identifies that the data frame A (130) is transmitted via the second hierarchy channel A (162-1). In addition, the metadata A (131) includes encapsulation data item (EDI) A (123-2) that includes control information and/or other metadata specific to the second hierarchy channel A (162-1). In one or more embodiments, the encapsulation data item is unique for each channel. In other words, different data frames transmitted via a channel include the same encapsulation data item while data frames transmitted via different channels (of the same hierarchy or different hierarchies) include different encapsulation data items. For example, control information and/or other metadata in the encapsulation data item is unique to a particular tunnel or layer of VPN because tunneling/VPN involves repackaging traffic data into a different form that is specific to each tunnel or VPN layer.

In one or more embodiments, the data frame A (130) is further encapsulated inside an upper layer data frame (i.e., data frame B (133)) for further transmission via the first hierarchy channel B (162). The data frame B (133) includes the metadata B (134) and payload B (135) that are transmitted via the first hierarchy channel B (162). The payload B (135) includes the data frame A (130). The metadata B (134) includes a channel identifier B (134-1) identifying that the data frame B (133) is transmitted via the first hierarchy channel B (162). In addition, the metadata B (134) includes EDI B (134-2) that includes control information and/or other metadata specific to the second hierarchy channel A (162-1). Although not explicitly shown, the data frame B (133) may be further encapsulated inside yet another upper layer data frame for further transmission via one or more virtualized building blocks corresponding to the first hierarchy (160-1). In other words, the data frame A (130) may be hierarchically encapsulated inside multiple layers of data frames.

FIG. 1.4 shows a network device (110) in accordance with one or more embodiments. The modules and elements of FIGS. 1.1, 1.2, 1.3, 1.4, and 1.5 are collectively referenced in describing the network device (110) below. In particular, the network device (110) includes example details of the network device X (106-1), network device Y (106-2), and/or network device Z (106-3) depicted in FIG. 1.1 above. In one or more embodiments, the network device (110) is a singular physical device in the network (150) depicted in FIG. 1.1 above. In one or more embodiments, one or more of the modules and elements shown in FIG. 1.4 may be omitted, repeated, and/or substituted. Accordingly, embodiments of the invention should not be considered limited to the specific arrangements of modules shown in FIG. 1.4.

As shown in FIG. 1.4, the network device (110) includes one or more data path elements (e.g., data path processor A (111), data path processor B (112), data path processor C (113)) coupled to respective ports (e.g., port A (110-1), port B (110-2), port C (110-3)), an encapsulation engine (114), and a repository (120) that are coupled to each other via a communication link (115). Each of these components may include a software component, a hardware component, or a combination thereof.

In one or more embodiments of the invention, the repository (120) includes a disk drive storage device, a semiconductor storage device, a database management system, other suitable computer data storage devices, or combinations thereof. In one or more embodiments, content stored in the repository (120) may be a data file, a linked list, a data sequence, a database, a graphical representation, or any other suitable data structure. In one or more embodiments of the invention, the repository (120) includes functionality to store data for the network device (110), such as the data generated and/or used by the data path processor A (111), data path processor B (112), data path processor C (113) and/or encapsulation engine (114).

In one or more embodiments of the invention, the content stored in the repository (120) includes a hierarchical data structure (120-1) and data frames with corresponding encapsulation results (e.g., data frame (120-2) and encapsulation result (120-3)). For example, the data frame (120-2) may correspond to the data frame A (130) or data frame B (133) depicted in FIG. 1.3 above. In particular, a portion of the repository (120) is designated as a data frame buffer for storing the data frame A (130) while a separate portion of the repository (120) is designated as another data frame buffer for storing the data frame B (133). Each data frame buffer may be specified by a pointer and a size that uniquely identify where the data frame is stored in the repository (120). The hierarchical data structure (120-1) is a hierarchy of parent-child relationships used by the encapsulation engine (114) to retrieve encapsulation data items (e.g., EDI A (123-2), EDI B (134-2) depicted in FIG. 1.3) in response to an instruction from the data path processor A (111). In particular, the encapsulation data items are stored with corresponding channels in the hierarchical data structure (120-1). In one or more embodiments, the hierarchical data structure (120-1) includes a tree hierarchy, a linked list, or other types of data structure with a hierarchy. The encapsulation result (120-3) is the result generated by the encapsulation engine (114) for the data frame A (130) based on the retrieved encapsulation data items (e.g., EDI A (123-2), EDI B (134-2)). In one or more embodiments, the encapsulation result (120-3) includes the retrieved encapsulation data items (e.g., EDI A (123-2), EDI B (134-2)) organized in a pre-determined format for the data path processor A (111) to hierarchically encapsulate the data frame A (130). In one or more embodiments, the encapsulation result (120-3) includes the hierarchically encapsulated form of the data frame A (130) based on the retrieved encapsulation data items (e.g., EDI A (123-2), EDI B (134-2)).

In one or more embodiments, the hierarchy of parent-child relationships in the hierarchical data structure (120-1) is defined according to the hierarchy of the virtual network structure (160). In other words, the parent-child relationships in the hierarchical data structure (120-1) correspond to the parent-child relationships in the virtual network structure (160). In one or more embodiments, the parent-child relationships are represented by hierarchical links. FIG. 1.5 shows an example of the hierarchical data structure (120-1) that includes leaf nodes (i.e., node J (141-1), node K (142-1), node L (142-2)) and non-leaf nodes (i.e., node M (141-2), node I (140)). As shown in FIG. 1.5, each arrow points from a child node to a parent node is a hierarchical link representing the parent-child relationship of two linked nodes. A leaf node is a node that does not have any child node. A non-leaf node is a parent node to at least one child node. In particular, the node M (141-2) is a parent node of the node K (142-1) and node J (141-1). Similarly, the node I (140) is a parent node of the node L (142-2) and node M (141-2).

Each node corresponds to an individual channel of the virtual network structure. Corresponding to FIG. 1.2, the node J (141-1), node K (142-1), node L (142-2), node M (141-2), and node I (140) depicted in FIG. 1.5 represent the second hierarchy channel A (162-1), second hierarchy channel B (162-2), first hierarchy channel A (161), first hierarchy channel B (162), and the first hierarchy (160-1), respectively, of the virtual network structure (160).

In one or more embodiments, each node references a location in the repository (120) for storing the encapsulation data item of the corresponding channel. For example, the node J (141-1), node K (142-1), and node M (141-2), reference the locations where the EDI J (123-2), EDI K (142), and EDI M (144), respectively, are stored. The hierarchical data structure (120-1) is any data structure that maintains a hierarchy having a parent child relationship between nodes. Examples of a hierarchy include logical trees, logical forests, and partially ordered sets. For example, a logical tree has a specific numbers of nodes, leaf nodes, non-leaf nodes, parent nodes, and child nodes, whereby each child node has a parent node and each parent node has one or more child nodes. The hierarchical data structure (120-1) may have any number of nodes, leaf nodes, non-leaf nodes, parent nodes, and child nodes. In addition, the hierarchical data structure (120-1) may also be organized in different format from FIG. 1.2, such as a linked list, a graph, etc.

In one or more embodiments, the hierarchy of the channels of the virtual network structure (160) is reconfigurable, e.g., by the network provisioning server (101). In one or more embodiments, the parent-child relationships of the hierarchical data structure (120-1) are implemented using group-reconfigurable links. For example, the node J (141-1) and node K (142-1) are linked using group-reconfigurable links (150-1) and (150-2) to the node M (141-2). As noted above, a hierarchical link corresponds to a parent-child relationship in the virtual network structure (160). A link group is a set of hierarchical links based on a pre-determined grouping criterion. A group-reconfigurable link is a type of hierarchical link that may form a link group with other group-reconfigurable link. Multiple group-reconfigurable links in the link group are reconfigurable simultaneously as a single group. For example, the group-reconfigurable links (150-1) and (150-2) form the link group (150). By a single link group reconfiguring action to change the link group (150) from linking the node M (141-2) to linking the node L (142-2), the second hierarchy channel A (162-1) and second hierarchy channel B (162-2) may be reconfigured as children of the first hierarchy channel A (161) instead of the first hierarchy channel B (162). An example of the virtual network structure (160) based on the group-reconfigurable links is described in reference to FIGS. 3.1-3.3.

Returning to the discussion of FIG. 1.4, in one or more embodiments of the invention, the data path processor A (111) includes an integrated network interface (111-A) and one or more computing cores (e.g., core 0 (111-1), ..., core N−1 (111-N)) where N denotes the number of computing cores. In one or more embodiments, the data path processor A (111) is a single integrated circuit, such as an X86 processor based integrated circuit. In other words, the computing cores (e.g., core 0 (111-1), ..., core N−1 (111-N)) are x86 compatible computing circuits. In one or more embodiments, the network device (110) includes different types of data path processors. For example, the data path processor B (112) may be a stand-alone network interface card with limited computing capability. In another example, the data path processor C (113) may be hardwired, such as implemented using a field programmable gate array (FPGA) instead of x86 compatible processors.

In one or more embodiments of the invention, the data path processor A (111), data path processor B (112), and data path processor C (113) are configured to process data frames (e.g., data frame (120-2)) for transmission. In particular, processing data frames includes determining routing destinations and performing encapsulation or other network management tasks. In one or more embodiments, each data path processor (e.g., data path processor A (111)) is configured to execute a single write instruction to transmit the channel identifier in connection with the corresponding data frame to the encapsulation engine (114) for encapsulation offload. In response, the encapsulation engine (114) returns the encapsulation result. Based on the encapsulation result, the data path processor (e.g., data path processor A (111)) transmits the data frame in the encapsulated form via at least the channel identified by the channel identifier. In one or more embodiments, the data frame is sent via the channel within multiple layers of channels in the virtual network structure. For example, the port A (110-1) may encompass multiple layers of channels and used by the data path processor A (111) to transmit respective data frames to/from a destination external to the network device (110).

In one or more embodiments of the invention, the communication link (115) includes address signals and data signals for exchanging information among the data path processor A (111), data path processor B (112), data path processor C (113), the encapsulation engine (114), and the repository (120). In particular, the communication link (115) includes electrical and/or optical communication hardware (e.g., signal traces, transceivers, etc.) for transmitting the address signals and data signals. In one or more embodiments, executing the aforementioned single write instruction initiates a single write cycle of the communication link (115). Specifically, the single write cycle includes a write address (based on the channel identifier) and a write data (based on the information identifying where the data frame is stored) that are driven onto the communication link (115) by the data path processor A (111), data path processor B (112), or data path processor C (113). An example of the single write instruction and single write cycle is described in reference to FIGS. 3.5 and 3.6 below. In one or more embodiments, the data path processor A (111), data path processor B (112), and data path processor C (113) process data frames (e.g., data frame (120-2)) for transmission using the method described in reference to FIGS. 2.1 and 2.2 below.

In one or more embodiments of the invention, the encapsulation engine (114) includes an input receiver (114-1), an encapsulation analyzer (114-2), and an encapsulation generator (114-3). In one or more embodiments, the encapsulation engine (114) is implemented as a single integrated circuit, such as a field programmable gate array (FPGA). In one or more embodiments, the encapsulation engine (114) is a physically distinct device from the data path processors, such as the data path processor A (111). In one or more embodiments, the encapsulation engine (114) is integrated within the data path processor A (111). For example, the encapsulation engine (114) may be implemented as a dedicated computing core (e.g., core N–1 (111-N)) or an embedded FPGA circuitry, while other computing cores (e.g., core 0 (111-1)) perform data path processing tasks of the data path processor A (111). In one or more embodiments, the input receiver (114-1) is configured to receive information (i.e., channel identifier in connection with the data frame) contained in the aforementioned single write cycle. In one or more embodiments, the write address is based on the channel identifier to address a data port of the input receiver (114-1) while the write data is based on the data frame buffer information to be written into the data port. For example, the data port may be a data register embedded in the input receiver (114-1). In another example, the data port may be memory-mapped in the repository (120). In one or more embodiments, the input receiver (114-1) is configured to receive the information (i.e., channel identifier in connection with the data frame) contained in the aforementioned single write cycle using other applicable schemes.

In one or more embodiments, in response to the single write cycle, the encapsulation analyzer (114-2) is configured to traverse the hierarchical data structure (120-1) based on the channel identifier for obtaining encapsulation data items of traversed nodes. In one or more embodiments, the encapsulation generator (114-3) is configured to generate the encapsulation result for the data frame based on the encapsulation data items. In one or more embodiments, the input receiver (114-1), the encapsulation analyzer (114-2), and the encapsulation generator (114-3) cooperatively perform the functions of the encapsulation engine (114) using the method described in reference to FIGS. 2.1 and 2.2 below.

Although traversal of the parent-child relationships is described above to start from a leaf node corresponding to the channel identifier specified in the single write instruction, in one or more embodiments, the single write instruction may also specify a channel identifier that corresponds to a non-leaf node to start the parent-child traversal.

FIG. 2.1 shows a flowchart in accordance with one or more embodiments. The process depicted in FIG. 2.1 may be used to offload encapsulation data item look up from a data path processor of a network device to an encapsulation engine of the network device. The process shown in FIG. 2.1 may be executed, for example, by one or more components discussed above in reference to FIGS. 1.1-1.5. One or more steps shown in FIG. 2.1 may be omitted, repeated, and/or performed in a different order among different embodiments of the invention. Accordingly, embodiments of the invention should not be considered limited to the specific number and arrangement of steps shown in FIG. 2.1.

Initially, in Step 201, a channel identifier in connection with a data frame is received by the encapsulation engine from the data path processor. The channel identifier identifies a channel from a number of channels of the network. For example, the number of channels may form a virtual network structure of the network where the channel may be within multiple layers of channels. In one or more embodiments, the data frame is pending transmission by the network device via at least the channel. Specifically, the channel identifier in connection with a data frame is sent to the encapsulation engine to perform encapsulation offload such that the data path processor may transmit the data frame in an encapsulated form with reduced amount of processing.

In one or more embodiments, the channel identifier in connection with the data frame is received via a single write instruction executed by the data path processor. Thus a single write instruction triggers the encapsulation engine to perform encapsulation offloading. For example, the single write instruction may include the channel identifier, a data frame pointer referencing the data frame, and a data frame size of the data frame. In other words, the channel identifier, the data frame pointer, and data frame size are inserted by the data path processor in the single write cycle. In one or more embodiments, the single write instruction initiates a single write cycle of a communication link between the data path processor and the encapsulation engine. To perform the single write cycle, the channel identifier may be used to generate address signals of the communication link while the data frame pointer and data frame size are used to generate data signals of the communication link. Accordingly, the channel identifier in connection with the data frame is received by the encapsulation engine from the single write cycle.

Using the single write instruction, the offloading of varying complexities of hierarchical encapsulation consumes a consistent instruction cycle utilization of the data path processor as well as consumes a consistent bus cycle utilization of the communication link. Accordingly, one or more embodiments saves computing cycles of the data path processor.

In Step 202, the encapsulation engine traverses, based on the channel identifier in connection with the data frame, a hierarchical data structure that includes a number of hierarchical encapsulation data items corresponding to the number of channels. For example, the channel identifier may correspond to a leaf node of the hierarchical data structure and the traversal starts from the leaf node to follow links representing parent-child relationships of the hierarchical data structure. In another example, the channel identifier may correspond to a non-leaf node of the hierarchical data structure and the traversal starts from the non-leaf node. In one or more embodiments, the traversal ends where no more link remains to be followed and the ending node corresponds to a port of the network device for transmitting the data frame in the encapsulated form.

In Step 203, a number of linked encapsulation data items are selected, by the encapsulation engine traversing the hierarchical data structure, from the hierarchical encapsulation data items in the hierarchical data structure. For each node traversed in the hierarchical data structure, the encapsulation data item is retrieved/selected to be linked. The linked encapsulation data items are linked to the channel identifier and are used to encapsulate the data frame.

In Step 204, an encapsulation result is generated by the encapsulation engine based on the linked encapsulation data items. In one more embodiments, the encapsulation result includes the linked encapsulation data items formatted by the encapsulation engine for sending to the data path processor. In particular, the encapsulation result does not include the entirety of the data frame itself. In one more embodiments, the encapsulation result includes the data frame and linked encapsulation data items that are collectively formatted by the encapsulation engine for sending to the data path processor.

In Step 205, the encapsulation result is sent to the data path processor for transmitting the data frame via at least the channel. In one or more embodiments, a direct memory access (DMA) operation is initiated by the encapsulation engine to send the encapsulation result to the data path processor. In one or more embodiments, the data frame is sent via the channel within multiple layers of channels in the virtual network structure.

FIG. 2.2 shows a flowchart in accordance with one or more embodiments. The process depicted in FIG. 2.2 may be used for encapsulation offload performed with reconfiguration of the virtual network structure. The process shown in FIG. 2.2 may be executed, for example, by one or more components discussed above in reference to FIGS. 1.1-1.5. One or more steps shown in FIG. 2.2 may be omitted, repeated, and/or performed in a different order among different embodiments of the invention. Accordingly, embodiments of the invention should not be considered limited to the specific number and arrangement of steps shown in FIG. 2.2.

Initially in Step 211, a link group is generated that includes a number of group-reconfigurable links. For example, the link group may be generated by a network provisioning server, a data path processor, or other devices in the network. In one or more embodiments, the group-reconfigurable links in the link group are reconfigurable simultaneously as a single group. In one or more embodiments, the group-reconfigurable links allow a virtual network structure to be reconfigured expediently according to the network service requirement of the client devices.

In Step 212, a hierarchical data structure is generated by linking a number of channels of the network using at least the link group. For example, the hierarchical data structure may be generated by a network provisioning server, a data path processor, or other devices in the network. For example, the number of channels may form a virtual network structure of the network where a channel may be within multiple layers of channels. In one or more embodiments, encapsulation data items of the channels and corresponding channel identifiers are stored in the hierarchical data structure according to parent-child relationships of the layers of channels.

In Step 213, a channel identifier in connection with a first data frame is sent from the data path processor to the encapsulation engine to perform encapsulation offload. In response, a first set of linked encapsulation data items that are linked to the channel identifier in the hierarchical data structure are retrieved by the encapsulation engine. The linked encapsulation data items in the first set are linked to the channel identifier via at least one group-reconfigurable link in the link group. Accordingly, the first data frame is transmitted in the encapsulated form based on the first set of linked encapsulation data items.

In Step 214, the virtual network structure is reconfigured subsequent to encapsulating the first data frame above. For example, the virtual network structure may be reconfigured by the network provisioning server, the data path processor, or other devices in the network. For example, the reconfiguration may be due to a revised service requirement initiated by a network service provisioning server. In one or more embodiments, the group-reconfigurable links in the link group are simultaneously reconfigured in the hierarchical data structure using a single link group reconfiguring action. Accordingly, the at least one group-reconfigurable link in the hierarchical data structure is reconfigured into a revised group-reconfigurable link in the revised hierarchical data structure. In particular, the revised hierarchical data structure correspond to the layers of channels in the reconfigured virtual network structure.

In Step 215, subsequent to reconfiguring the virtual network structure above, the channel identifier in connection with a second data frame is sent from the data path processor to the encapsulation engine to perform encapsulation offload. The channel identifier is the same as used in the encapsulation offload performed in Step 214. In contrast, the second data frame is a different data frame than the first data frame in the encapsulation offload performed in Step 214. In response, a second set of linked encapsulation data items that are linked to the channel identifier in the revised hierarchical data structure are retrieved by the encapsulation engine. The linked encapsulation data items in the second set are linked to the channel identifier via at least the revised group-reconfigurable link in the link group. Accordingly, the second data frame is transmitted in the encapsulated form based on the second set of linked encapsulation data items. In particular, the first data frame and the second data frame are encapsulated using different encapsulation data items that are specific to the virtual network structure prior to being reconfigured and the subsequently reconfigured virtual network structure.

FIGS. 3.1, 3.2, 3.3, 3.4, and 3.5 show an example in accordance with one or more embodiments of the invention. The components and elements of FIGS. 3.1-3.5 are collectively referenced below in describing the example. In one or more embodiments, one or more of the modules and elements shown in FIGS. 3.1-3.5 may be omitted, repeated, and/or substituted. Accordingly, embodiments of the invention should not be considered limited to the specific arrangements of modules shown in FIGS. 3.1-3.5.

FIG. 3.1 shows an example tunnel structure (310), which corresponds to the virtual network structure (160) depicted in FIG. 1.2 above. Specifically, the first hierarchy (160-1), first hierarchy channel A (161), first hierarchy channel B (162), second hierarchy channel A (162-1), and second hierarchy channel B (162-2) correspond to the port A (310-20), tunnel FOO (310-17), tunnel FUM (310-13), tunnel FEE0 (310-10), and tunnel FEE1 (310-15), respectively. The channel identifier of each tunnel is denoted as N in the tunnel structure (310). For example, the channel identifier for the tunnel FEE0 (310-10) is 10, the channel identifier for the tunnel FEE1 (310-15) is 15, etc. In addition, three input data frames are received via the tunnel FOO (310-17), tunnel FEE0 (310-10), and tunnel FEE1 (310-15), that are denoted as arrows. Each input data frame is a tunnel specific customer data item. For example, the tunnel FOO (310-17), tunnel FEE0 (310-10), and tunnel FEE1 (310-15) are allocated by the network service provider for customer A video traffic, customer B traffic, and customer A web traffic, respectively.

FIG. 3.2 shows example hierarchical data structures for the tunnel structure (310), which corresponds to the virtual network structure (160) depicted in FIG. 1.2 above. The hierarchical data structure A (320-1) is an example of the hierarchical data structure (120-1), shown in FIG. 1.5 above, for the virtual network structure (160). In particular, the hierarchical data structure A (320-1) is defined according to the parent-child relationships of the tunnel structure (310). Specifically, the node 20 (320-20), node 17 (320-17), node 13 (320-13), node 10 (320-10), and node 15 (320-15) correspond to the port A (310-20), tunnel FOO (310-17), tunnel FUM (310-13), tunnel FEE0 (310-10), and tunnel FEE1 (310-15), respectively.

Similar to the hierarchical data structure (120-1), the node 10 (320-10) and node 15 (320-15) are linked to the node 13 (320-13) in the hierarchical data structure A (320-1) via two group-reconfigurable links in the link group (350). Accordingly, the tunnel structure (310) may be reconfigured by reconfiguring the hierarchical data structure A (320-1) into the hierarchical data structure B (320-2) using a single group-reconfiguring action. In particular, the single group-reconfiguring action simultaneously reconfigures the two group-reconfigurable links in the link group (350) from pointing to the node 13 (320-13) to pointing to the node 17 (320-17). Accordingly, the tunnel structure (310) is revised such that the tunnel FEE0 (310-10) and tunnel FEE1 (310-15) are moved to be within the tunnel FOO (310-17) instead of being within the tunnel FUM (310-13). In the reconfigured tunnel structure, the tunnel FOO (310-17) is allocated by the network service provider for customer A video traffic, customer B traffic, and customer A web traffic while the tunnel FUM (310-13) is allocated for other applications.

FIG. 3.3 shows an example of traversing the hierarchical data structure A (320-1) depicted in FIG. 3.2 above. Specifically, FIG. 3.3 shows a linked list having a encapsulation content table (338) and a next tunnel table (339), which is a version of the hierarchical data structure A (320-1). For example, the hierarchy trees shown in FIG. 3.2 may be automatically converted to the encapsulation content table (338) and next tunnel table (339). Further, the data path processor instruction (334) is the single instruction sent by a data path processor to an encapsulation engine. Specifically, the data path processor instruction (334) includes a channel identifier (337), a data frame pointer (335), and a data frame size (336). The channel identifier (337) is used by the encapsulation engine to select an entry in the encapsulation content table (338) as the starting point of the traversal. The data frame pointer (335) and data frame size (336) identify where the data frame (344) is stored in the data repository. In addition, the DMA engine descriptor (330) is a data table storing direct memory access (DMA) parameters that are used to return the encapsulation result from the encapsulation engine to the data path processor. In particular, the variable source (332) and variable length (333) identify the source memory address range of the DMA operation where the encapsulation engine stores the encapsulation result. Correspondingly, the DMA destination (331) identifies the destination memory address of the DMA operation where the data path processor uses as the egress transmission buffer. For example, the data frame pointer (335) and data frame size (336) may be used to initialize the variable source (332) and variable length (333), which are subsequently revised by the encapsulation engine to reflect the expanded data buffer for an encapsulated data frame (346).

As shown in FIG. 3.3, the encapsulation content table (338) includes entries shown as individual rows that are identified by the channel identifiers. The entries with the channel identifiers 10, 13, 15, 17, and 20 correspond to the node 10 (320-10), node 13 (320-13), node 15 (320-15), node 17 (320-17), and node 20 (320-20), respectively, shown in FIG. 3.2. Accordingly, the entries with the channel identifiers 10, 13, 15, 17, and 20 correspond to the tunnel FEE0 (310-10), tunnel FUM (310-13), tunnel FEE1 (310-15), tunnel FOO (310-17), and port A (310-20), respectively, shown in FIG. 3.1. Each entry in the encapsulation content table (338) further includes respective values for a tunnel type, content of encapsulation data items (i.e., Encap Content), and tunnel table index.

For example, the channel identifier (337) may select (denoted as an arrow 001) the entry with the channel identifier "10", which includes values "VLAN", "Encap Content A (340)", and "0x3" for the tunnel type, encapsulation data items, and tunnel table index, respectively. In particular, the value "VLAN" indicates that the channel identified by the channel identifier "10" is a VLAN channel. The "Encap Content A (340)" includes encapsulation data items to be attached to the data frame (344) for the VLAN channel to form an encapsulated data frame (345). The value "0x3" points (denoted as the arrow 002) to an entry in the next tunnel table (339) having a next channel identifier "13" and last encapsulation flag (i.e., Last Encap) "FALSE". The value "FALSE" indicates that the additional encapsulation data items remain to be retrieved by the encapsulation engine. The next channel identifier "13" points (denoted as the arrow 003) back to the entry with the channel identifier "13" in the encapsulation content table (338). The traversal continues in a similar manner as denoted by the arrows 004, 005, and 006. For example, the "Encap Content C (342)" includes additional encapsulation data items to be attached to the data frame (344) for the MPLS channel to form an encapsulated data frame (346). The last traversed entry in the encapsulation content table (338) has the channel identifier "20" and corresponds to the port A (310-2) shown in FIG. 3.1. In particular, the tunnel type and content of encapsulation data items have values "NULL" for the port A (310-2). Correspondingly, the tunnel table index "0x5" points to the entry in the next tunnel table (339) having "NULL" for the next channel identifier and "TRUE" for the last encapsulation flag. Accordingly, the traversal terminates and the encapsulation engine initiates a DMA operation using the DMA engine descriptor (330) to return the encapsulation result to the data processor. For example, the DMA operation may transfer the encapsulated data frame (346) to the egress transmission buffer for transmitting by the data processor. In another example, the DMA operation may transfer the Encap A (340) and Encap C (342) to the egress transmission buffer for the data processor to assemble the encapsulated data frame (346) for transmission.

As noted above, the encapsulation content table (338) and next tunnel table (339) may include group-reconfigurable links. For example, the entries identified by the channel identifiers "10" and "15" in the encapsulation content table (338) include the same value "0x3" for the tunnel table index. In other words, both entries identified by the channel identifiers "10" and "15" are linked, using respective group-reconfigurable links, to the same entry in the next tunnel index table (339). A single action (i.e., the single link group reconfiguration action) of changing the next channel identifier "13", associated with the tunnel table index "0x3" in the next tunnel table (339), to the value "17" modifies the hierarchical data structure A (320-1) to the hierarchical data structure B (320-2), as shown in FIG. 3.2 above. Subsequent to such reconfiguration, the encapsulation engine traversal starting with the channel identifier "10" will pass through the MPLS channel with the channel identifier "13" instead of "17". As a result, a second data buffer of the VLAN channel with channel identifier "10" will be encapsulated using the Encap Content A (340) and the Encap Content D (343). This is different from the encapsulated data frame (346) prior to the single link group reconfiguration action.

FIG. 3.4 shows examples of the single write instruction described above. Specifically, the example instructions are based on a channel identifier field (341) and a data-data frame-attribute field (342). Using the single write instruction, the offloading of varying complexities of hierarchical encapsulation data item look up consumes a consistent instruction cycle utilization of the data path processor. Depending on whether the single write instruction is issued before or after the reconfiguration of the tunnel structure (310) above, the encapsulation engine may select linked encapsulation data items from the hierarchical data structure A (320-1) or hierarchical data structure B (320-2) for returning to the data path processor. For example, in preparation for transmitting a data frame A (not shown) of the tunnel FEE0 (310-10), the data path processor executes the instruction A (340-1) that includes (i) the channel identifier field (341) containing the channel identifier "10" of the tunnel FEE0 (310-10), and (ii) the data-data frame-attribute field (342) containing a data frame pointer and data frame size (i.e., DATA_DATA FRAME_ATTRIBUTE A) that identify where the data frame A is stored in the repository.

In another example, in preparation for transmitting a data frame B (not shown) of the tunnel FEE1 (310-15), the data path processor executes the instruction B (340-2) that includes (i) the channel identifier field (341) containing the channel identifier "15" of the tunnel FEE1 (310-15), and (ii) the data-data frame-attribute field (342) containing a data frame pointer and data frame size (i.e., DATA_DATA FRAME_ATTRIBUTE B) that identify where the data frame B is stored in the repository.

In yet another example, in preparation for transmitting a data frame C (not shown) of the tunnel FOO (310-17), the data path processor executes the instruction C (340-3) that includes (i) the channel identifier field (341) containing the channel identifier "17" of the tunnel FOO (310-17), and (ii) the data-data frame-attribute field (342) containing a data frame pointer and data frame size (i.e., DATA_DATA FRAME_ATTRIBUTE C) that identify where the data frame C is stored in the repository.

FIG. 3.5 shows examples of the single write cycle described above. Specifically, the example write cycles are based on address signals (350-1), data signals (350-2), and a write enable signal (350-3). Using the single write cycle, the offloading of varying complexities of hierarchical encapsulation data item look up consumes a consistent bus cycle utilization of the communication link. For example, the single write cycle A (351), single write cycle B (352), and single write cycle C (353) are initiated by the data path processor executing the instruction A (340-1), instruction B (340-2), and instruction C (340-3), respectively. When performing the single write cycle A (351), the address signals (350-1) take on the value "Address A" to select a data port of the encapsulation engine, the data signals (350-2) take on the value "DATA_DATA FRAME_ATTRIBUTE A" to be written into the selected data port, and the write enable signal (350-3) indicates the period when the address signals (350-1) and data signals (350-2) are valid. The single write cycle B (352) and single write cycle C (353) are performed similarly. As noted above, the data port may be a data register embedded in the encapsulation engine circuitry or memory-mapped in the repository (120) accessible by the encapsulation engine (114).

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a network, comprising:
receiving, by an encapsulation engine of a network device from a data path processor of the network device, a channel identifier in connection with a first data frame, wherein the channel identifier identifies a first channel of a plurality of channels of the network;
traversing, by the encapsulation engine based on the channel identifier in connection with the first data frame, a hierarchical data structure, wherein the hierarchical data structure comprises a plurality of hierarchical encapsulation data items corresponding to the plurality of channels;
selecting, from the plurality of hierarchical encapsulation data items by the encapsulation engine based on traversing the hierarchical data structure, a first plurality of linked encapsulation data items that are linked to the channel identifier;

generating, by the encapsulation engine based on selecting the first plurality of linked encapsulation data items, a first encapsulation result;
sending, to the data path processor, the first encapsulation result for transmitting the first data frame via at least the first channel;
generating a link group comprising a plurality of group-reconfigurable links, wherein the plurality of group-reconfigurable links are reconfigurable simultaneously as a single group; and
generating the hierarchical data structure by linking the plurality of the channels using at least the link group,
wherein the first plurality of linked encapsulation data items are linked to the channel identifier via at least one group-reconfigurable link in the link group.

2. The method of claim 1, further comprising:
reconfiguring, using a single link group reconfiguring action, the plurality of group-reconfigurable links simultaneously in the hierarchical data structure, wherein the at least one group-reconfigurable link is reconfigured into a revised group-reconfigurable link;
receiving, by the encapsulation engine and subsequent to reconfiguring the plurality of group-reconfigurable links, the channel identifier in connection with a second data frame, wherein the second data frame is pending transmission by the network device via at least the first channel;
generating, by the encapsulation engine based at least on the revised group-reconfigurable link, a second encapsulation result for the second data frame; and
sending, to the data path processor, the second encapsulation result for transmitting the second data frame via at least the first channel.

3. The method of claim 1, further comprising:
executing, by the data path processor, a single write instruction to transmit the channel identifier in connection with the first data frame,
wherein the single write instruction comprises the channel identifier, a first data frame pointer referencing the first data frame, and a first data frame size of the first data frame.

4. The method of claim 3,
wherein the single write instruction initiates a single write cycle of a communication link between the data path processor and the encapsulation engine, and
wherein the single write cycle comprises:
a write address based on the channel identifier; and
a write data item based on the first data frame pointer and the first data frame size of the first data frame.

5. The method of claim 1, further comprising:
embedding, by the encapsulation engine, the first plurality of linked encapsulation data items into a pre-determined encapsulation data structure, wherein the first encapsulation result comprises the pre-determined encapsulation data structure in association with the first data frame;
initiating, by the encapsulation engine, a direct memory access (DMA) operation to send the first encapsulation result to the data path processor; and
encapsulating, by the data path processor based on the first encapsulation result, the first data frame for transmitting via at least the channel.

6. The method of claim 1, further comprising:
encapsulating, by the encapsulation engine based on the first encapsulation result, the first data frame into an encapsulated data frame, wherein the first encapsulation result comprises the encapsulated data frame; and
initiating, by the encapsulation engine, a direct memory access (DMA) operation to send the encapsulated data frame to the data path processor for transmitting via at least the first channel.

7. A network device of a network, comprising:
an encapsulation engine configured to:
receive, from a data path processor, a channel identifier in connection with a first data frame, wherein the channel identifier identifies a first channel of a plurality of channels of the network;
traverse, based on the channel identifier in connection with the first data frame, a hierarchical data structure, wherein the hierarchical data structure comprises a plurality of hierarchical encapsulation data items corresponding to the plurality of channels;
select, from the plurality of hierarchical encapsulation data items based on traversing the hierarchical data structure, a first plurality of linked encapsulation data items that are linked to the channel identifier;
generate, based on selecting the first plurality of linked encapsulation data items, a first encapsulation result; and
send, to the data path processor, the first encapsulation result;
the data path processor configured to:
send, to the encapsulation engine, the channel identifier in connection with the first data frame; and
transmit the first data frame via at least the first channel based on the first encapsulation result;
a repository storing the hierarchical data structure and the first data frame; and
a computer processor and memory comprising instructions, when executed, causing the computer processor to:
generate a link group comprising a plurality of group-reconfigurable links, wherein the plurality of group-reconfigurable links are reconfigurable simultaneously as a single group; and
generate the hierarchical data structure by linking the plurality of the channels using at least the link group,
wherein the first plurality of linked encapsulation data items are linked to the channel identifier via at least one group-reconfigurable link in the link group,
wherein the encapsulation engine and the repository each include circuitry communicatively coupled via a communication link.

8. The network device of claim 7,
wherein the instructions, when executed, further cause the computer processor to:
reconfigure, using a single link group reconfiguring action, the plurality of group-reconfigurable links simultaneously in the hierarchical data structure, wherein the at least one group-reconfigurable link is reconfigured into a revised group-reconfigurable link;
wherein the encapsulation engine is further configured to:
receive, from the data path processor and subsequent to reconfiguring the plurality of group-reconfigurable links, the channel identifier in connection with a second data frame, wherein the second data frame is pending transmission by the network device via at least the first channel;
generate, based at least on the revised group-reconfigurable link, a second encapsulation result for the second data frame; and send, to the data path processor, the second encapsulation result for transmitting the second data frame via at least the first channel.

9. The network device of claim 7, wherein the data path processor is further configured to:
execute a single write instruction to transmit the channel identifier in connection with the first data frame,
wherein the single write instruction comprises the channel identifier, a first data frame pointer referencing the first data frame, and a first data frame size of the first data frame.

10. The network device of claim 9, wherein the single write instruction initiates a single write cycle of the communication link between the data path processor and the encapsulation engine, and wherein the single write cycle comprises:
a write address based on the channel identifier; and
a write data item based on the first data frame pointer and the first data frame size of the first data frame.

11. The network device of claim 7,
wherein the encapsulation engine is further configured to:
embed the first plurality of linked encapsulation data items into a pre-determined encapsulation data structure, wherein the first encapsulation result comprises the pre-determined encapsulation data structure in association with the first data frame; and
initiate a direct memory access (DMA) operation to send the first encapsulation result to the data path processor, and
wherein the data path processor is further configured to:
encapsulate, based on the first encapsulation result, the first data frame for transmitting via at least the channel.

12. The network device of claim 7, wherein the encapsulation engine is further configured to:
encapsulate, based on the first encapsulation result, the first data frame into an encapsulated data frame, wherein the first encapsulation result comprises the encapsulated data frame; and
initiate a direct memory access (DMA) operation to send the encapsulated data frame to the data path processor for transmitting via at least the first channel.

13. An encapsulation engine circuitry for a network device, comprising:
an input receiver configured to:
receive, from a data path processor of the network device, a channel identifier in connection with a first data frame, wherein the channel identifier identifies a first channel of a plurality of channels of the network;
an encapsulation analyzer configured to:
traverse, based on the channel identifier in connection with the first data frame, a hierarchical data structure, wherein the hierarchical data structure comprises a plurality of hierarchical encapsulation data items corresponding to the plurality of channels; and
select, from the plurality of hierarchical encapsulation data items based on traversing the hierarchical data structure, a first plurality of linked encapsulation data items that are linked to the channel identifier; and an encapsulation generator configured to:
generate, based on selecting the first plurality of linked encapsulation data items, a first encapsulation result; and
send, to the data path processor, the first encapsulation result for transmitting the first data frame via at least the first channel; and
a computer processor and memory comprising instructions, when executed, causing the computer processor to:
generate a link group comprising a plurality of group-reconfigurable links, wherein the plurality of group-reconfigurable links are reconfigurable simultaneously as a single group; and
generate the hierarchical data structure by linking the plurality of the channels using at least the link group,
wherein the first plurality of linked encapsulation data items are linked to the channel identifier via at least one group-reconfigurable link in the link group.

14. The encapsulation engine circuitry of claim 13,
wherein the instructions, when executed, further cause the computer processor to:
reconfigure, using a single link group reconfiguring action, the plurality of group-reconfigurable links simultaneously in the hierarchical data structure, wherein the at least one group-reconfigurable link is reconfigured into a revised group-reconfigurable link;
wherein the encapsulation engine circuitry is further configured to:
receive, from the data path processor and subsequent to reconfiguring the plurality of group-reconfigurable links, the channel identifier in connection with a second data frame, wherein the second data frame is pending transmission by the network device via at least the first channel;
generate, based at least on the revised group-reconfigurable link, a second encapsulation result for the second data frame; and
send, to the data path processor, the second encapsulation result for transmitting the second data frame via at least the first channel.

15. The encapsulation engine circuitry of claim 13, wherein the data path processor of the network device is configured to:
execute a single write instruction to transmit the channel identifier in connection with the first data frame,
wherein the single write instruction comprises the channel identifier, a first data frame pointer referencing the first data frame, and a first data frame size of the first data frame.

16. The encapsulation engine circuitry of claim 15,
wherein the single write instruction initiates a single write cycle of communication link between the data path processor and the encapsulation engine circuitry, and
wherein the single write cycle comprises:
a write address based on the channel identifier; and
a write data item based on the first data frame pointer and the first data frame size of the first data frame.

* * * * *